(12) United States Patent
Suter

(10) Patent No.: US 12,728,978 B2
(45) Date of Patent: Sep. 8, 2026

(54) PANEL SYSTEMS AND METHODS FOR HELICOPTERS

(71) Applicant: NORTH WEST HELI-STRUCTURES INCORPORATED, Bellingham, WA (US)

(72) Inventor: Anthony Suter, Bellingham, WA (US)

(73) Assignee: North West Heli-Structures Incorporated, Bellingham, WA (US)

(*) Notice: Subject to any disclaimer, the term of this patent is extended or adjusted under 35 U.S.C. 154(b) by 161 days.

(21) Appl. No.: 18/191,421

(22) Filed: Mar. 28, 2023

(65) Prior Publication Data

US 2023/0242235 A1 Aug. 3, 2023

Related U.S. Application Data

(63) Continuation of application No. 16/880,751, filed on May 21, 2020, now Pat. No. 11,613,340.

(51) Int. Cl.

*B64C 1/12* (2006.01)
*B64C 27/04* (2006.01)
*B64C 1/00* (2006.01)

(52) U.S. Cl.

CPC ................ *B64C 1/12* (2013.01); *B64C 27/04* (2013.01); *B64C 2001/0081* (2013.01)

(58) Field of Classification Search

CPC .................................... B64C 1/12; B64C 3/26
See application file for complete search history.

(56) References Cited

U.S. PATENT DOCUMENTS

2006/0226287 A1* 10/2006 Grantham ................. B64C 5/06 244/119
2008/0111024 A1* 5/2008 Lee ......................... B64C 1/068 244/119

(Continued)

FOREIGN PATENT DOCUMENTS

EP 0485027 A2 * 5/1991
EP 3281861 A1 * 2/2018 ............... B64C 1/06
GB 2528078 A * 1/2016 ............ B29C 53/04

OTHER PUBLICATIONS

Airframe Structures, Michael Niu, 1999, Hong Kong Conmilt Press, Second Edition, pp. 207-243 (Year: 1999).*

(Continued)

*Primary Examiner* — Joshua J Michener
*Assistant Examiner* — Ryan Andrew Yankey
(74) *Attorney, Agent, or Firm* — Michael R. Schacht; Bronte Brillantes; Schacht Law Office, Inc.

(57) ABSTRACT

A blank panel assembly comprising a skin panel configured to define a brace region and an accessory region and a brace assembly operatively connected to the skin panel within the brace region of the skin panel. The brace assembly comprises first and second main members, a plurality of cross members, and plurality of brace members. The first and second main members are riveted to the skin panel within at least a portion of the brace region. The plurality of cross members are riveted to the skin panel within at least a portion of the brace region. The third cross member portions are riveted to the third main member portions. The at least one accessory is adapted to be supported by the skin panel in the accessory region.

12 Claims, 11 Drawing Sheets

(56) References Cited

U.S. PATENT DOCUMENTS

| | | | |
|---|---|---|---|
| 2014/0272312 | A1 | 9/2014 | Sammons |
| 2017/0253316 | A1 | 9/2017 | Benthien et al. |
| 2020/0113054 | A1 | 4/2020 | Nino |

OTHER PUBLICATIONS

Bell Helicopter, A Trexton Company, BHT-ALL-SRM/BHT-MED-SRM-1, Dec. 14, 2010, 3 pages.

* cited by examiner 70
120
34
130
80
122

120
80
70
34
130
122

40
160
162
174
172
170
168
166
164
132

40
144
D4
194
154
192
154
190
152
142
154
188
154
186
146
180
154
184
D2
182
D3
154
D1
130
140

PANEL SYSTEMS AND METHODS FOR HELICOPTERS

RELATED APPLICATIONS

This application, U.S. application Ser. No. 18/191,421 filed Mar. 28, 2023, is a continuation of Ser. No. 16/880,751 filed May 21, 2020, now U.S. Pat. No. 11,613,340 issued Mar. 28, 2023.

The contents of the '751 application is incorporated herein by reference.

TECHNICAL FIELD

The present invention relates to panels for helicopters and, more specifically, to systems and methods for designing and fabricating panels for helicopters.

BACKGROUND

Helicopters comprise basic structural and mechanical systems that interoperate to allow the helicopter to take off, fly, and land safely. The basic structural and mechanical systems of a helicopter will be referred to herein as the helicopter airframe.

A helicopter typically further includes accessory packages configured to allow a particular helicopter to serve a particular purpose. Helicopter accessory packages are adapted to facilitate the performance of a predetermined task by a particular helicopter. For example, a helicopter may be sold in versions or models that are configured for predetermined tasks such as search and rescue or passenger transport. The accessory packages for a helicopter used for passenger transport may include a first seat configuration comprising two rows of seats, while the accessory packages for a helicopter used for passenger transport may include a second seat configuration comprising a single row of seats and rescue specific equipment such as motorized winches.

The helicopter airframe is configured to support the accessory packages. Ideally, the helicopter airframe requires little or no modification to support the accessory packages, but in practice at least some components of the helicopter airframe are modified as required by a particular configuration of accessory packages. For example, certain accessory packages require perforation of or the attachment of components to panels forming a part of the helicopter airframe. Certain panels of a helicopter airframe thus must be customized for a particular helicopter model to allow that helicopter model to carry the accessory packages necessary for the predetermined task associated with that particular helicopter model.

One goal of the present invention is to provide panel systems and methods for helicopters that facilitate customization of helicopter frame panels to facilitate the fabrication and repair of helicopters.

SUMMARY

The present invention may be embodied as a blank panel assembly configurable for a particular helicopter configuration of a helicopter airframe configurable in one of a plurality of helicopter configurations. In this first example, the blank panel assembly comprises a skin panel and a brace assembly. The skin panel is configured to define a brace region and an accessory region, where the brace region and the accessory region are located relative to the skin panel based on operational characteristics of the particular helicopter configuration. The brace assembly is operatively connected to the skin panel within the brace region of the skin panel. The brace assembly comprises first and second main members, a plurality of cross members, and a plurality of brace members. The first and second main members each define a first main member portion, a second main member portion, and a third main member portion. The plurality of cross members each define a first cross member portion, a second cross member portion, and a third cross member portion. The first main member portions of the first and second main members are riveted to the skin panel within at least a portion of the brace region. The first cross member portions of the plurality of cross members are riveted to the skin panel within at least a portion of the brace region such that portions of each of the third cross member portions is arranged between at least a portion of the third main member portion and the skin pane. The third cross member portions are riveted to the third main member portions such that the brace members are substantially parallel to the third main member portions and the third cross member portions and at least a portion of each third main member portion is arranged between at least a portion of each the brace member and at least a portion of each third cross member portion. The at least one accessory is adapted to be supported by the skin panel in the accessory region.

The present invention may also be embodied as configured panel assembly configured for a particular helicopter configuration of a helicopter airframe configurable in one of a plurality of helicopter configurations. In this example, the configured panel assembly comprises a skin panel, a brace assembly, and at least one accessory to be supported relative to the helicopter airframe in the particular helicopter configuration. The skin panel is configured to define a brace region and an accessory region, where the brace region and the accessory region are located relative to the skin panel based on operational characteristics of the particular helicopter configuration. The brace assembly is operatively connected to the skin panel within the brace region of the skin panel. The brace assembly comprises first and second main members, a plurality of cross members, and a plurality of brace members. The first and second main members each define a first main member portion, a second main member portion, and a third main member portion. The plurality of cross members each defines a first cross member portion, a second cross member portion, and a third cross member portion. The first main member portions of the first and second main members are riveted to the skin panel within at least a portion of the brace region. The first cross member portions of the plurality of cross members are riveted to the skin panel within at least a portion of the brace region such that portions of each of the third cross member portions is arranged between at least a portion of the third main member portion and the skin panel. The third cross member portions are riveted to the third main member portions such that the brace members are substantially parallel to the third main member portions and the third cross member portions and at least a portion of each third main member portion is arranged between at least a portion of each the brace member and at least a portion of each third cross member portion. The at least one accessory is supported by the skin panel in the accessory region.

The present invention may also be a configured panel assembly configured for a particular helicopter configuration of a helicopter airframe configurable in one of a plurality of helicopter configurations. In this example, the configured panel assembly comprises a metal skin, a brace assembly, and at least one accessory to be supported relative to the helicopter airframe in the particular helicopter configuration. The metal skin panel is configured to define a brace region and an accessory region, where the brace region and the accessory region are located relative to the skin panel based on operational characteristics of the particular helicopter configuration. The brace assembly is operatively connected to the skin panel within the brace region of the skin panel and comprises first and second metal main members, a plurality of metal cross members, a plurality of metal brace members, and at least one plate member. The first and second metal main members each define a first main member portion, a second main member portion, and a third main member portion. The plurality of metal cross members each defines a first cross member portion, a second cross member portion, and a third cross member portion. The first main member portions of the first and second main members are riveted to the skin panel within at least a portion of the brace region. The first cross member portions of the plurality of cross members are riveted to the skin panel within at least a portion of the brace region such that portions of each of the third cross member portions is arranged between at least a portion of the third main member portion and the skin panel. The third cross member portions are riveted to the third main member portions such that the brace members are substantially parallel to the third main member portions and the third cross member portions, at least a portion of each third main member portion is arranged between at least a portion of each the brace member and at least a portion of each third cross member portion, and the third cross member portions are riveted to the third main member portions through openings in the at least one plate member. The at least one accessory is supported by the skin panel in the accessory region.

DETAILED DESCRIPTION

Figure 1:
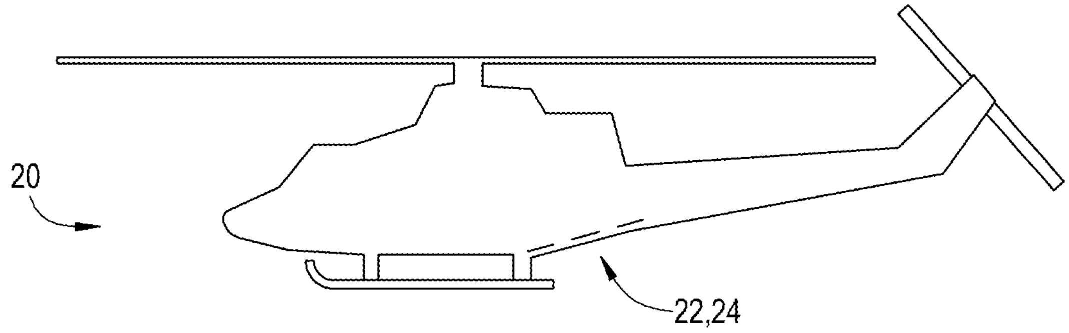
FIG. 1 is a side elevation view of a first example helicopter schematically depicting a panel system of the present invention.
Figure 2:
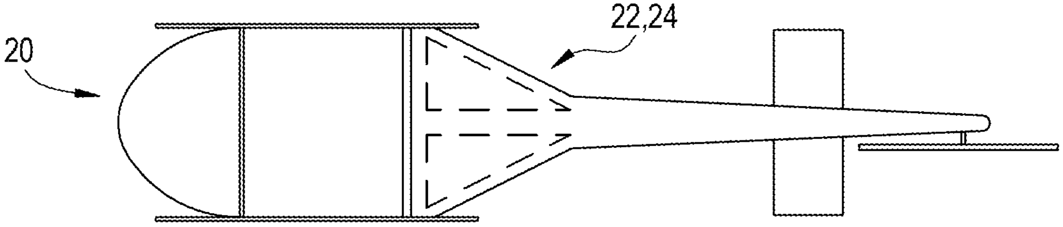
FIG. 2 is a bottom plan view of the first example helicopter schematically depicting a panel system of the present invention.

Referring initially to FIGS. 1 and 2 of the drawing, depicted therein is a helicopter airframe comprising one of a first panel system 22 or a second example panel system 24. The example helicopter airframe 20 is or may be conventional and will be described herein only to that extent helpful to a complete understanding of the present invention.

Figure 3:
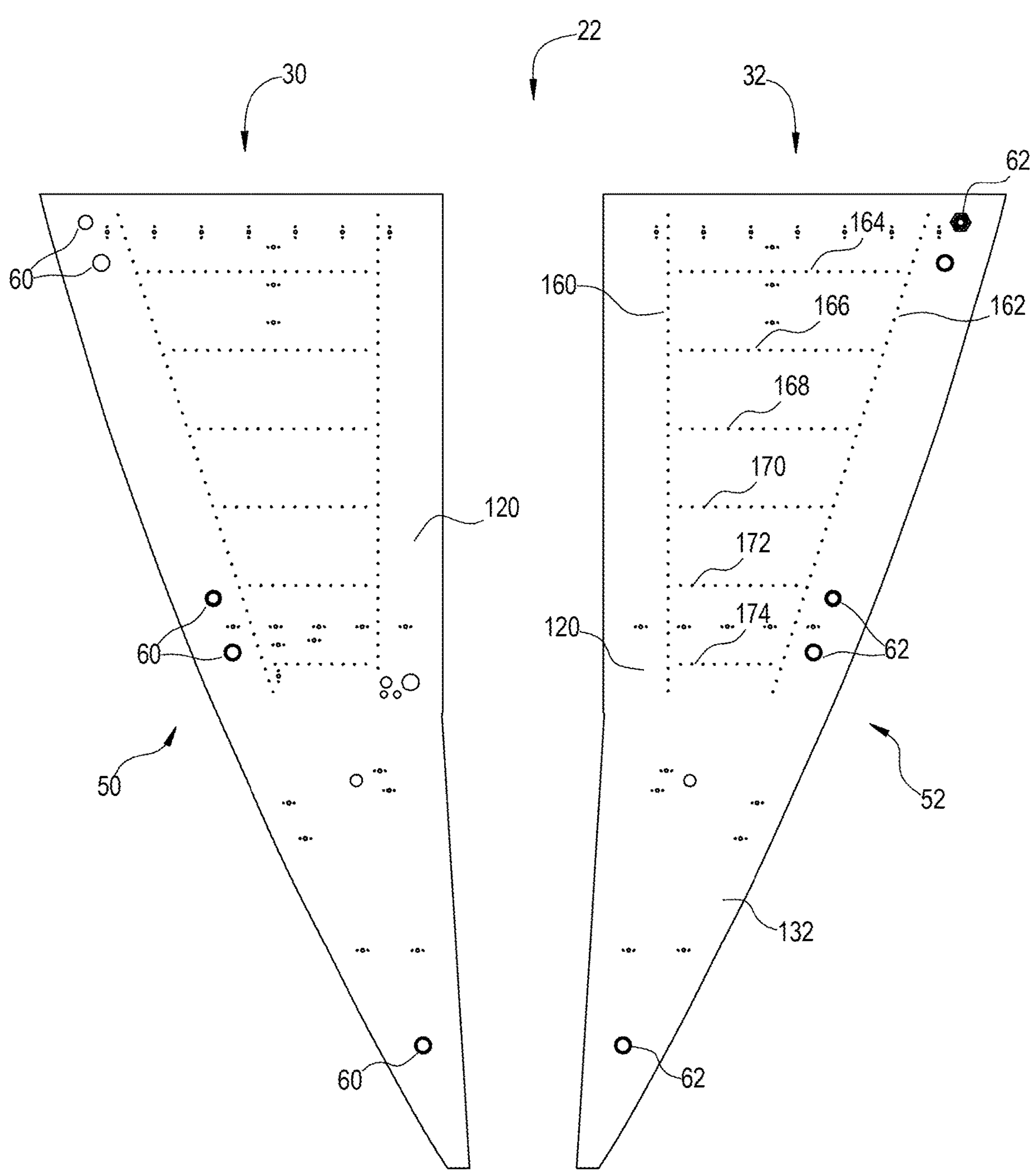
FIG. 3 is a bottom plan view depicting a first example panel assembly comprising first and second example configured panel assemblies of the present invention.
Figures 4, 5:
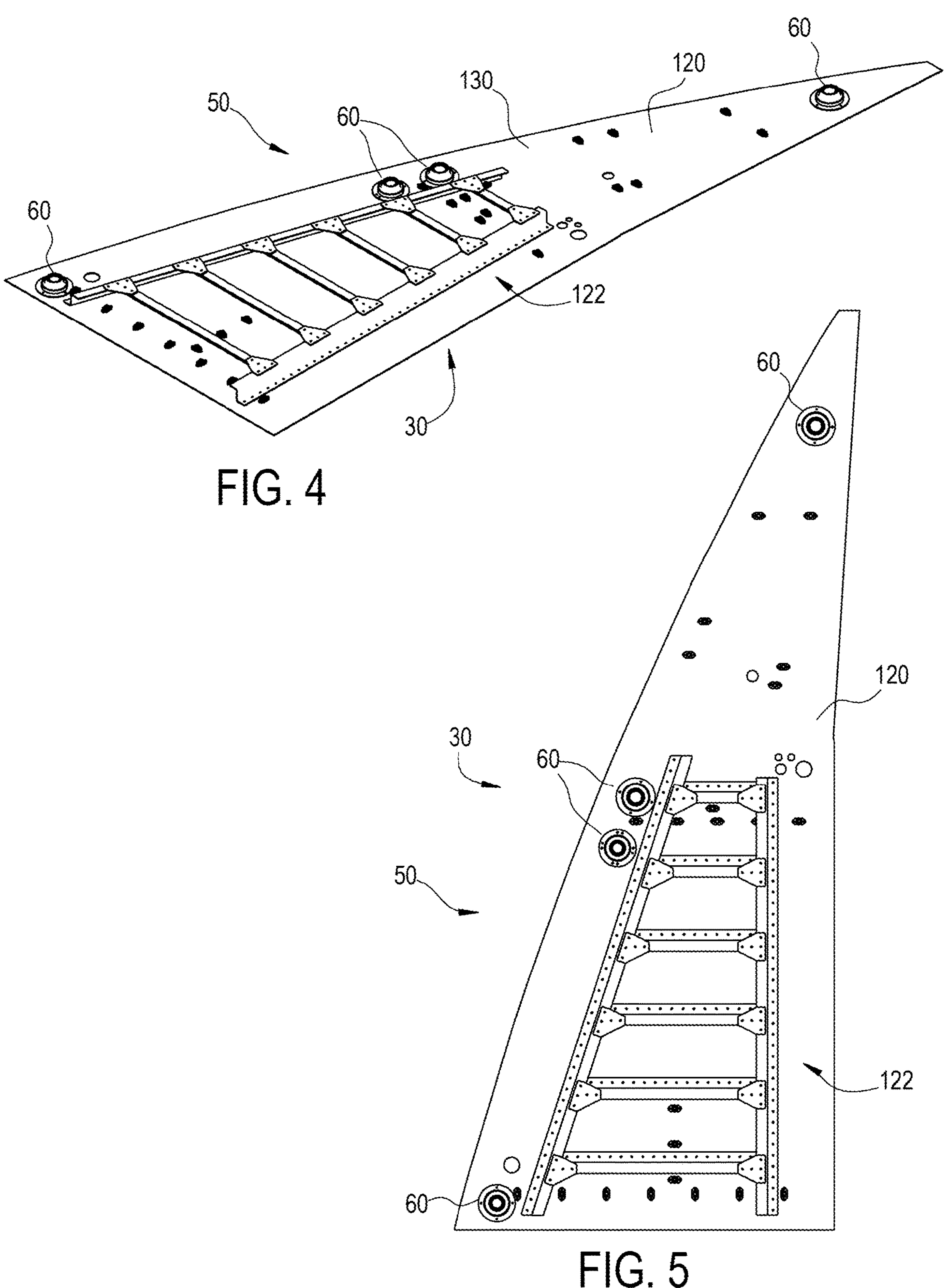
FIG. 4 is a perspective view of the top of the first example configured panel assembly.
FIG. 5 is a top plan view of the first example configured panel assembly.
Figure 6:
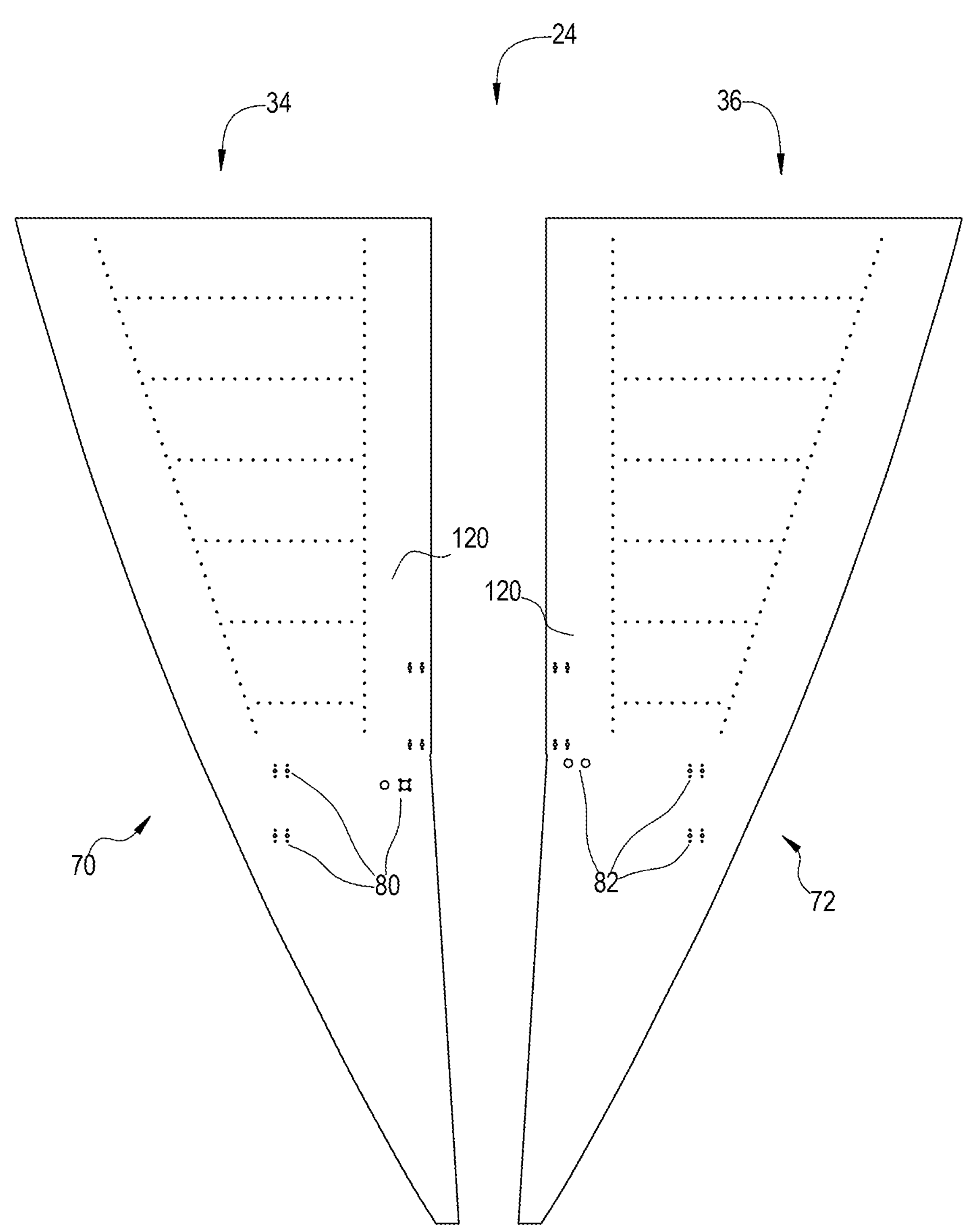
FIG. 6 is a bottom plan view depicting a second example panel assembly comprising third and fourth example configured panel assemblies of the present invention.
Figures 7, 8:
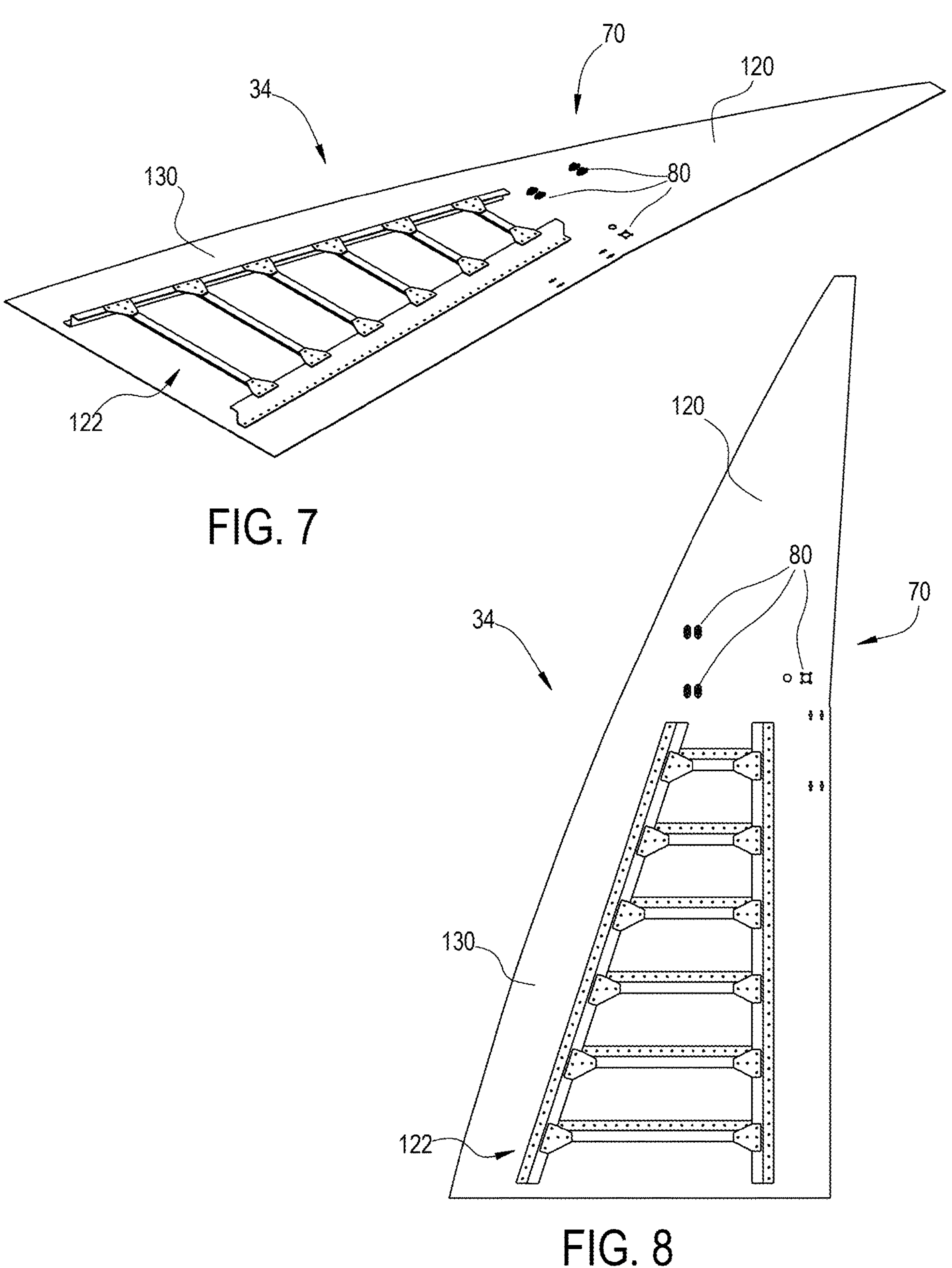
FIG. 7 is a perspective view of the top of the third example configured panel assembly.
FIG. 8 is a top plan view of the third example configured panel assembly.
Figure 9:
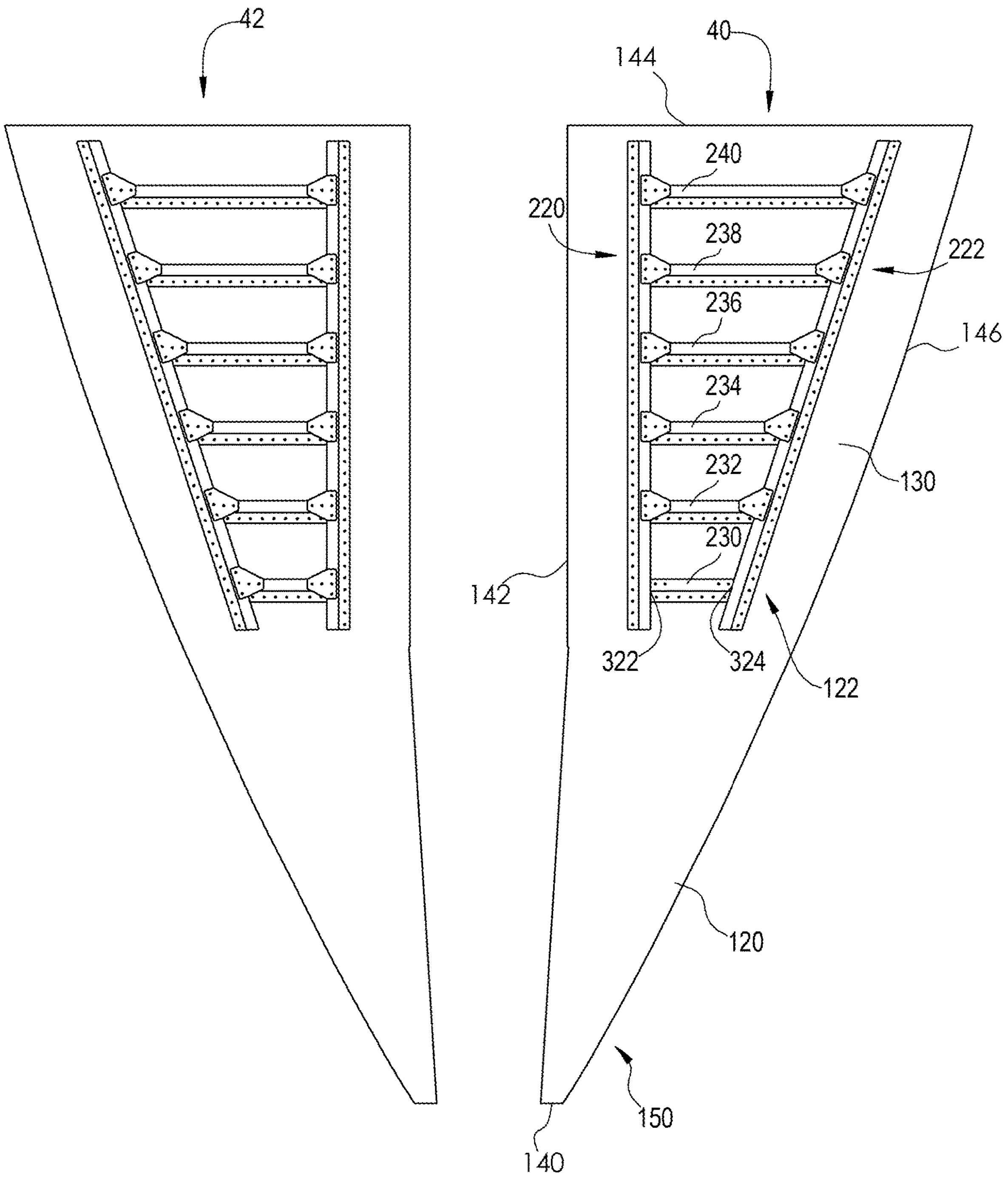
FIG. 9 is a top plan view depicting a first example blank panel assembly comprising first and second example blank panel assemblies of the present invention.

As shown in FIGS. 3-5, the first example panel system 22 comprises example first and second configured panel assemblies 30 and 32. FIGS. 6-8 illustrate that the second example panel system 24 comprises example third and fourth panel assemblies 34 and 36. FIGS. 9-17 illustrate example first and second blank panel assemblies 40 and 42. The example first and third panel assemblies 30 and 34 are formed from the example first blank panel assembly 40, while the example second and fourth panel assemblies 32 and 36 are formed from the example second blank panel assembly 42. Using standard blank panel assemblies such as the example blank panel assemblies 40 and 42, multiple panel systems such as the example first and second panel systems 22 and 24 may be formed.

More specifically, the example first panel system 22 is formed by modifying the first blank panel assembly 40 with a first example accessory package 50 to form the first configured panel assembly 30 and the second blank panel assembly 42 with a second example accessory package 52 to form the second configured panel assembly 32. The first example accessory package 50 comprises one or more first accessories 60, and the second example accessory package 52 comprises one or more second accessories 62. The example second panel system 22 is formed by modifying the first blank panel assembly 40 with an example third accessory package 70 to form the third configured panel assembly 34 and the second blank panel assembly 42 with an example fourth accessory package 72 to form the fourth configured panel assembly 36. The third example accessory package 70 comprises one or more third accessories 80, and the example fourth accessory package 72 comprises one or more fourth accessories 82.

The example helicopter airframe 20 is standard but is configured to be optimized for different functions. When configured with the first panel system 22, the helicopter airframe 20 would correspond to the Bell UH-1H model helicopter. When configured with the second panel system 24, the helicopter airframe 20 would correspond to the Bell 212/412 model helicopter. The size, location, and nature of the accessories 60 and 62 of the example first accessory systems 50 and 52 of the example first panel system 22 and the size, location, and nature of the accessories 80 and 82 of the example third and fourth accessory systems 70 and 72 of the second panel system 24 will be dictated by the model of helicopter airframe (e.g., Bell UH-1H or Bell 212/412) on which the panel systems 22 or 22 are to be mounted. The example accessory packages 50 and 70 are or may be conventional and will be described herein only to that extent helpful to a complete understanding of the present invention.

With the foregoing general understanding of the construction and operation of the example panel system 20 as described above, the details of construction and operation of the first example blank panel assembly 40 will now be described in detail with reference to FIGS. 9-17. The example first and second blank assemblies 40 and 42 are substantially the same but reversed in plan view relative to each other, so only the example first blank panel assembly 40 will be described herein in detail with the understanding that the explanation of the example first blank panel assembly 40 also applies to the second blank panel assembly 42. It should be understood, however, that the blank panel assemblies 40 and 42 need not be mirror images of each other in plan view depending on the requirements of a particular helicopter airframe 20.

The example first blank panel assembly 40 comprises a first example skin member 120 and a first example brace assembly 122. The first example skin member 120 is a flat sheet of material defining a first surface 130 and a second surface 132. The example first example brace assembly 122 is secured to the first surface 130 of the first example skin member 120. The first example skin member 120 further defines a first end edge 140, a second end edge 144, a first side edge 142, and a second side edge 146. A perimeter shape 150 of the first example skin member 120 extends along the first end edge 140, first side edge 144, second end edge 142, and second side edge 146. First and second sets of main skin openings 160 and 162 are formed in the first example skin member 120. First, second, third, fourth, fifth, and sixth sets of cross skin openings 164, 166, 168, 170, 172, and 174 are also formed in the first example skin member 120.

The first example brace assembly 122 is sized and dimensioned relative to and secured to the first example skin member 120 to provide sufficient rigidity to the example first blank panel assembly 40 to allow any configured panel assembly formed from the example first blank panel assembly 40 meet the operational requirements defined by the helicopter airframe 20. In particular, the example accessory package 50 is arranged such that the accessory package 50 does not penetrate or otherwise interfere with predefined structural characteristics of the skin 120 and the first example brace assembly 122.

The skin members 120 of the example first and second blank panel assemblies 40 and 42 are sized and dimensioned to form the example first and second configured skin panel assemblies 30 and 32 that may be mounted onto and form a part of the example helicopter airframe 20. To be used as part of the example helicopter airframe 20, the shape of the first example skin member 120 is configured such that the second end edge 144 is longer than the first end edge and the second side edge 146 is longer than the first side edge 144. The edges 140-146 define a perimeter shape 150 of the first example skin member 120. The perimeter shape 150 is generally trapezoidal, with the first and second end edges 140 and 144 forming the bases of the trapezoid, and the first and second side edges 142 and 146 forming the legs of the trapezoid. The perimeter shape 150 is, however, referred to herein as "generally trapezoidal" because the side edges 142 and 146 are not straight: the second side edge 146 follows a continuous curved line, while the first side edge 142 follows a discontinuous line formed by two discrete substantially linear segments.

Figures 10A, 10B:
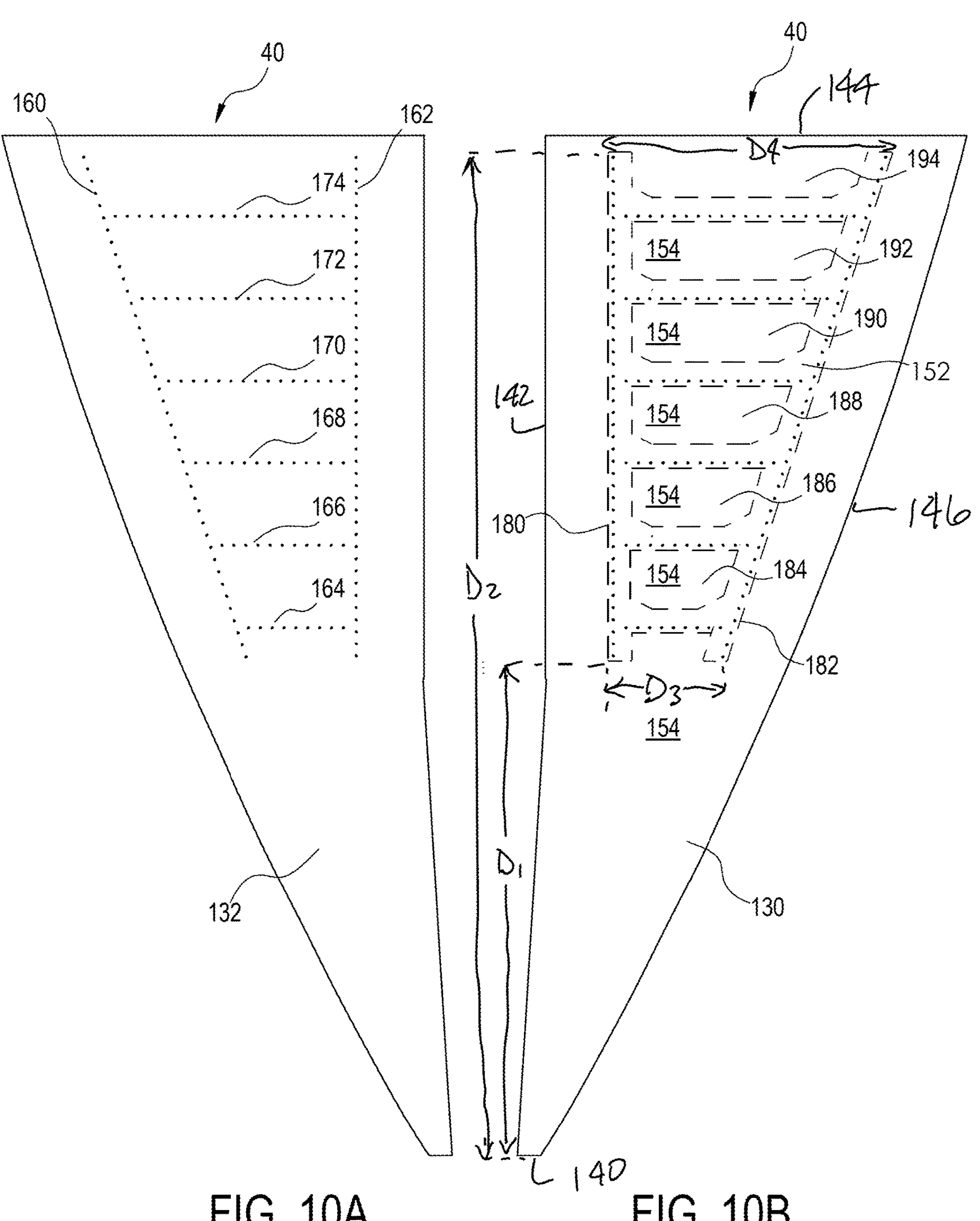
FIG. 10A is a top plan view of a first example blank skin member forming a part of the first example blank panel assembly.
FIG. 10B is a bottom plan view of the first example blank skin member.

FIG. 10B illustrates that a brace region 152 is defined within the perimeter shape 150 of the skin members 120. Any portion of the first example blank skin member 120 not within the brace region 152 is defined as an accessory region 154. The example brace region 152 is determined so that the accessories 60, 62, 80, and 82 of the example accessory packages 50, 52, 70, and 72, and the accessories of any other example accessory packages, do not lie within the brace region 152. Conversely, the example brace region 152 is determined so that the accessories 60, 62, 80, and 82 of the example accessory packages 50, 52, 70, and 72, and the accessories of any other example accessory packages, lie within the accessory region 154. Further, the brace region 152 is sized, dimensioned, and located such that the first example skin member 120 and first example brace assembly 122 cooperate to provide structural integrity to the example panel assemblies 30, 32, 34, and 36 as required by the helicopter airframe 20.

In particular, the example brace region 152 is continuous and defines first and second edge portions 180 and 182 and first, second, third, fourth, fifth, and sixth interior portions 184, 186, 188, 190, 192, and 194. The first and second sets of main skin openings 160 and 162 are within the first and second edge portions 180 and 182, respectively, of the example brace region 152. The first, second, third, fourth, fifth, and sixth sets of cross skin openings 164, 166, 168, 170, 172, and 174 are within the first, second, third, fourth, fifth, and sixth interior portions 184, 186, 188, 190, 192, and 194, respectively, of the example brace region 152. The example brace region 152 may be discontinuous. The example accessory region 154 is discontinuous and is defined as any portion of the first example skin member 120 not within the example brace region 152.

The example brace assembly 122 is thus a generally ladder-like structure in which the first and second main brace members 250 and 270 are angled with respect to each other and generally parallel to the first and second side edges 142 and 146 of the example skin member 120 when the first and second main assemblies 220 and 222 are attached to the example skin member 120. The cross brace members 320 of the first, second, third, fourth, fifth, and sixth cross assemblies 230, 232, 234, 236, 238, and 240 are substantially parallel to each other and to the first and second end edges 140 and 144 of the example skin member 120 when the example brace assembly 122 is secured to the example skin member 120.

The brace region 152 associated with the brace assembly 122 is similarly ladder-like in shape and starts at a first distance D1 and ends at a second distance D2 from the first end edge 140 of the skin member 120. A length of first end of the brace region 152 closest to the first end edge 140 is a third distance D3, and a length of the second end of the brace region 152 closest to the second end edge 144 is a fourth distance D4. The third distance D3 and fourth distance D4 are evenly spaced between the side edges 142 and 146.

When expressed as a percentage of the total distance between the first and second end edges 140 and 144, the first distance D1 and second distance D2 should fall within the parameters of the following Table A:

TABLE A

| Dimension | Preferred | First Preferred Range | Second Preferred Range |
|---|---|---|---|
| D1 | 48% | 47-49% | 45-51% |
| D2 | 98% | 97-99% | 95-100% |

When the third distance D3 is expressed as a percentage of the total distance between the first and second side edges 142 and 146 at the first distance D1 from the first end edge 140 and the fourth distance D4 is expressed as a percentage of the total distance between the first and second side edges 142 and 146 at the second distance D2 from the first end edge 140, third distance D3 and the fourth distance D2 should fall within the parameters of the following Table B:

TABLE B

| Dimension | Preferred | First Preferred Range | Second Preferred Range |
|---|---|---|---|
| D3 | 50% | 49-51% | 47-53% |
| D4 | 69% | 68-70% | 66-72% |

The dimensions set forth above allow the example brace assembly 122 to provide sufficient rigidity to the panel systems 22 or 24 comprising the configured panel assemblies 30 and 32 or 34 and 36 to meet operational requirements of the example helicopter airframe 20.

Figures 11, 12, 13:
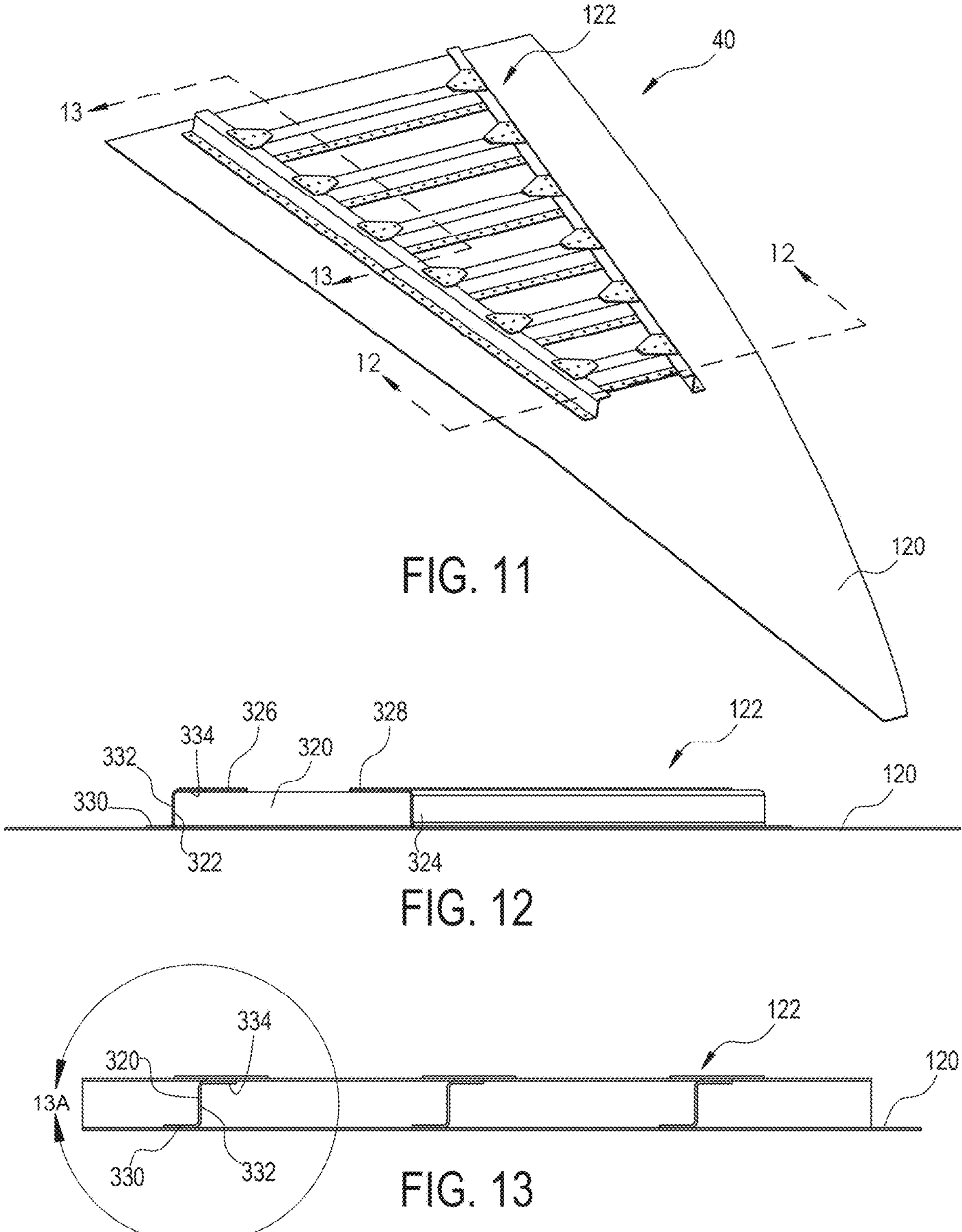
FIG. 11 is a top perspective view of the first example blank panel assembly.
FIG. 12 is a section view taken along lines 12-12 in FIG. 11.
FIG. 13 is a section view taken along lines 13-13 in FIG. 11.
Figures 13A, 14:
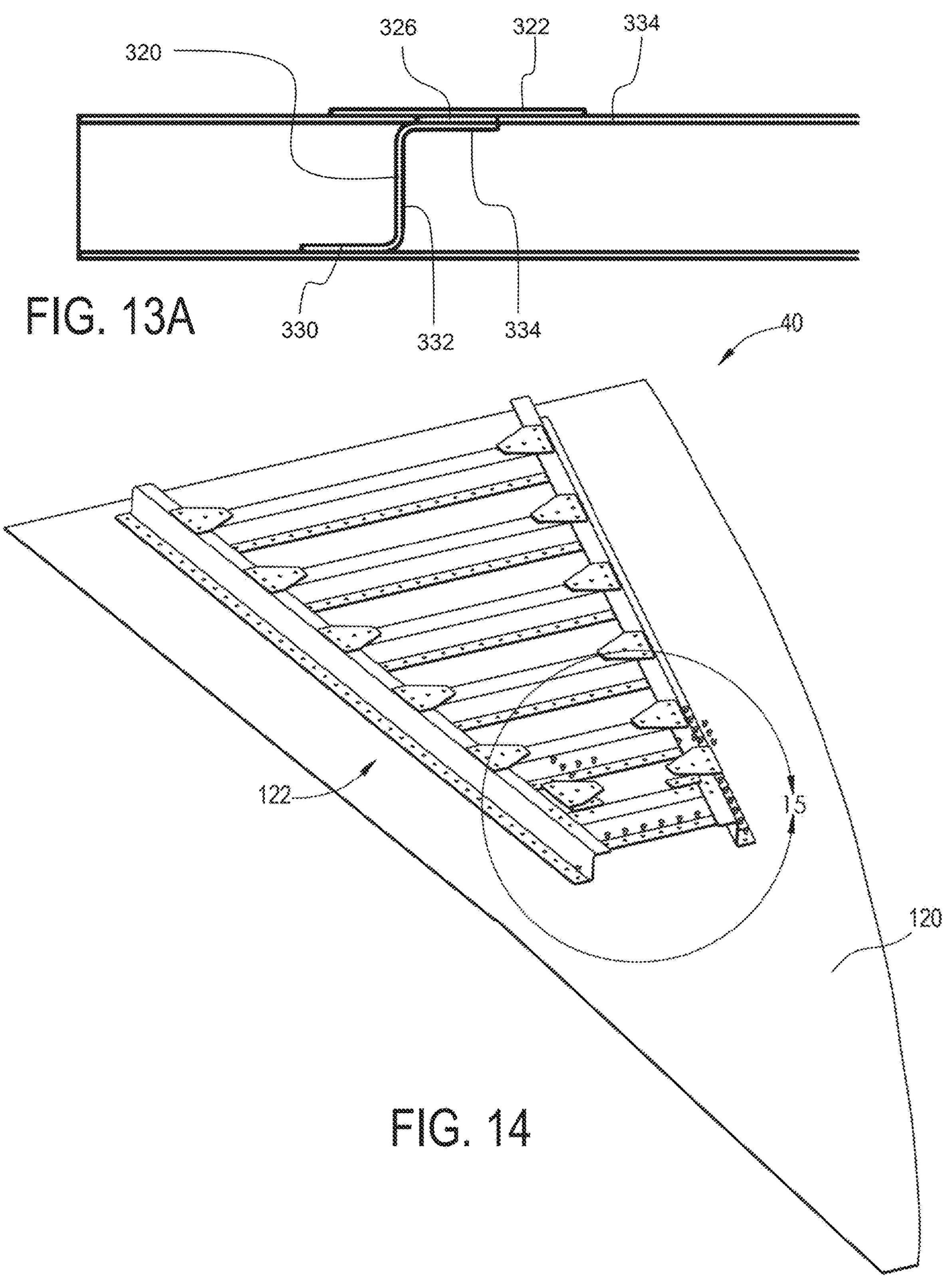
FIG. 14 is a top perspective, partial exploded view of the first example blank panel assembly.
Figure 15:
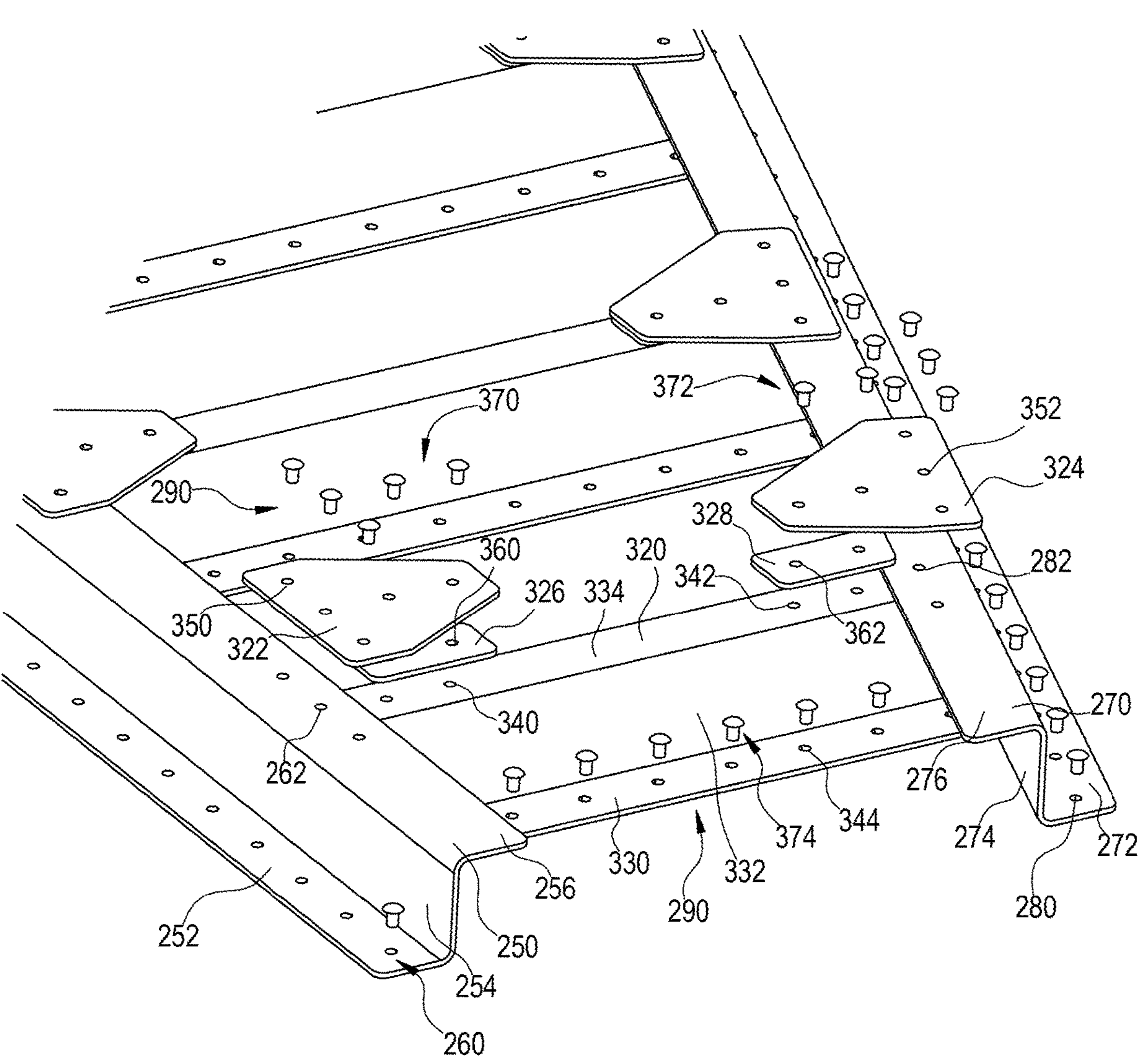
FIG. 15 is an enlarged view of a portion of FIG. 14.

FIGS. 11, 14, and 15 perhaps best illustrates that the example first example brace assembly 122 comprises first and second main assemblies 220 and 222 and first, second, third, fourth, fifth, and sixth cross assemblies 230, 232, 234, 236, 238, and 240.

Figures 16, 17:
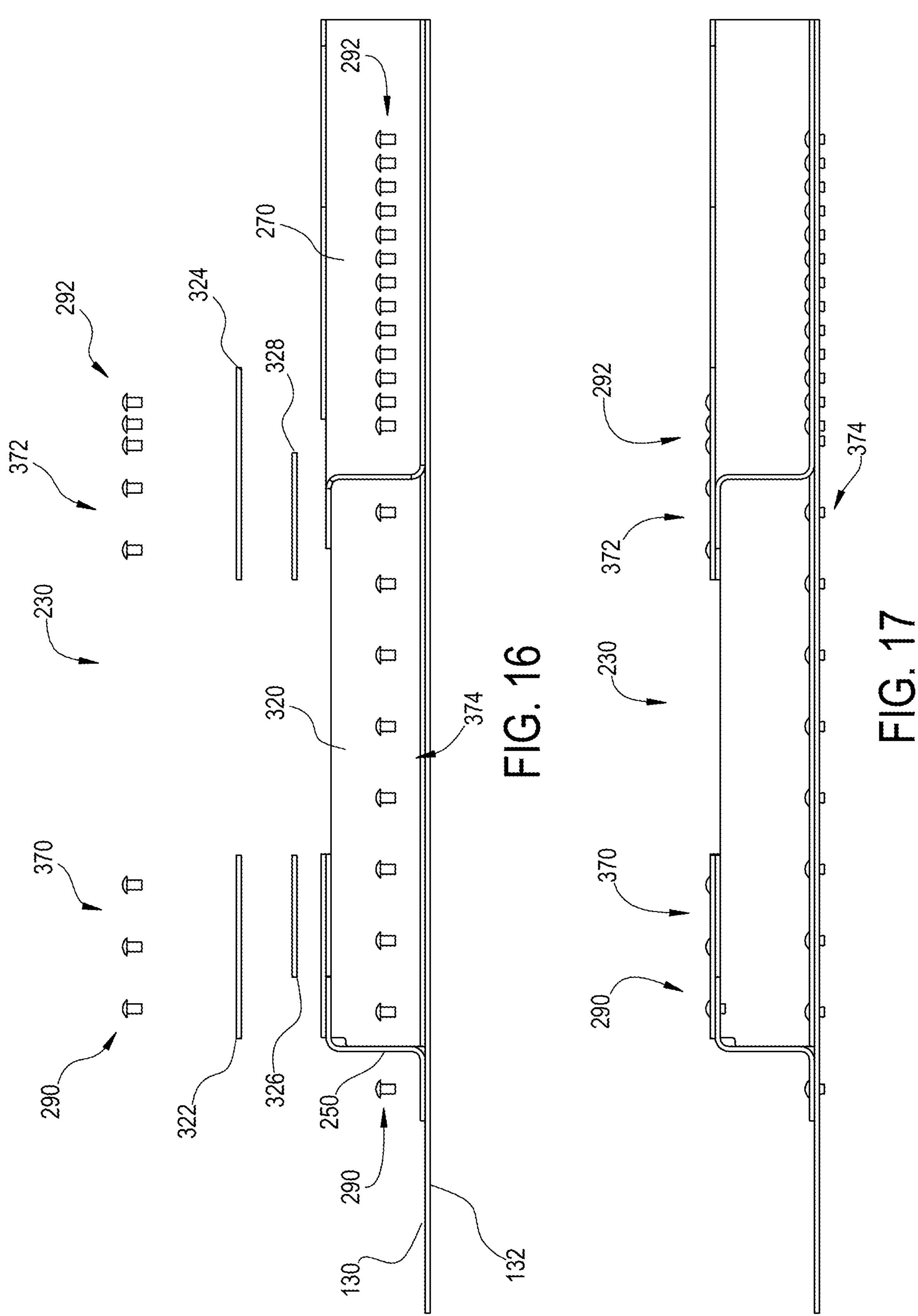
FIG. 16 is an end elevation exploded view of the first example blank panel assembly.
FIG. 17 is an end assembled view of the first example blank panel assembly.

The example first main assembly 220 comprises first main brace member 250 defining a main brace member outer portion 252, a main brace member spacing portion 254, and a main brace member inner portion 256. A first set of first main brace member openings 260 is formed in the first main brace member outer portion 252, and a second set of first main brace member openings 262 is formed in the first main brace member inner portion 256. FIG. 15 illustrates that the example second main assembly 222 comprises second main brace member 270 defining a main brace member outer portion 272, a main brace member spacing portion 272, and a main brace member inner portion 274. A first set of second main brace member openings 280 is formed in the second main brace member outer portion 272, and a second set of second main brace member openings 282 is formed in the second main brace member inner portion 276. As shown in FIG. 16, the example first main assembly 220 further comprises a first set of main rivets 290, while the example second main assembly 222 further comprises a second set of main rivets 292.

The example cross assemblies 230, 232, 234, 236, 238, and 240 are or may be similar, and only the example first cross assembly 230 will be described in detail herein. FIGS. 15, 16, and 17 illustrate that the example first cross assembly 230 comprises a cross brace member 320, a first end brace member 322, a second end brace member 324, a first end plate member 326, and a second end plate member 328. As shown in FIGS. 12, 13, and 15, the example first cross brace member 320 comprises a first portion 330, a second portion 332, and a third portion 334 and defines a first set of cross brace member openings 340, a second set of cross brace member openings 342, and a third set of cross brace member openings 344. The example first end brace member 322 defines a set of first end brace member openings 350, while the example second end brace member 324 defines a set of second end brace member openings 352. The example first end plate member 326 defines a set of first end plate member openings 360, while the example second end plate member 328 defines a set of second end plate member openings 362. As is clear from the drawing, the lengths of the cross brace members 320 and the number of brace member openings 344 in the third set differs in the example cross assemblies 230, 232, 234, 236, 238, and 240.

The first main assembly 220 is secured to the first example skin member 120 by aligning the first set of first main brace member openings 260 with the first set of skin openings 160 and riveting the first main brace member 250 to the first example skin member 120 using the first set of main brace member rivets 290. The second main assembly 222 is secured to the first example skin member 120 by aligning the first set of second main brace member openings 280 with the second set of skin openings 162 and riveting the second main brace member 270 to the first example skin member 120 using the second set of main brace member rivets 290.

Each of the example cross assemblies 230, 232, 234, 236, 238, and 240 are also secured to the first example skin member 120. In particular, the first cross assembly 230 is secured to the first example skin member 120 by aligning the first set of cross brace member openings 340 in the cross brace member 320 with the first cross skin openings 164 in the first example skin member 120 and riveting the cross brace member 320 to the first example skin member 120 using the first set of brace rivets 370. The remaining cross assemblies 232, 234, 236, 238, and 240 are similarly riveted to the first example skin member 120 using the second, third, fourth, fifth, and sixth cross skin openings 166, 168, 170, 172, and 174.

The first end brace member 322 and first end plate member 326 are arranged such that some of the first end brace member openings 350 are aligned with some the second set of first main brace member openings 262 in the first main brace member 250 and at least some of the first end brace member openings 350 and the first end plate member openings 360 are aligned with the second set of cross brace member openings 342 in the cross brace member 320. The first end brace member 322 and the first end plate member 326 are riveted to the cross brace member 320 and the first main brace member 250. The second end brace member 324 and second end plate member 328 are arranged such that some of the second end brace member openings 352 are aligned with some the second set of second main brace member openings 282 in the second main brace member 270 and at least some of the second end brace member openings 352 and the second end plate member openings 362 are aligned with the third set of cross brace member openings 344 in the cross brace member 320. The second end brace member 324 and the second end plate member 328 are riveted to the cross brace member 320 and the second main brace member 270. The remaining cross assemblies 232, 234, 236, 238, and 240 are similarly secured to the first and second main brace members 250 and 270.

At this point, the first example brace assembly 122 is secured to the first example skin member 120 such that the first blank panel assembly 40 is formed. The second blank panel assembly 42 is formed in a similar manner.

The accessories 60 and 62 or 80 and 82 may be attached to and/or formed in the blank panel assemblies 40 or 42 before and/or after the first example brace assembly 122 is attached to the first example skin member 120. For example, any accessory 60, 62, 80, or 82 defined by a through hole formed in the first example skin member 120 may be desirably formed prior to attachment of the first example brace assembly 122 to the first example skin member 120, while any accessory 60 or 62 defined by a fitting attached to the first example skin member 120 may be desirably formed after attachment of the first example brace assembly 122 to the first example skin member 120.

The material from which the example skin member 120 is fabricated is at least one of the following group of materials: stainless steel and titanium. The material from which the example brace assembly 122 is fabricated is at least one of the following group of materials: stainless steel and titanium.

What is claimed is:

1. A blank panel assembly configurable for a particular helicopter configuration of a helicopter airframe configurable in one of a plurality of helicopter configurations, where the particular helicopter configuration further comprises at least one accessory to be supported by the helicopter airframe in the particular helicopter configuration, the blank panel assembly comprising:

a skin panel configured to define a brace region and an accessory region, where the brace region and the accessory region are located relative to the skin panel based on operational characteristics of the particular helicopter configuration;

a brace assembly operatively connected to the skin panel within the brace region of the skin panel, the brace assembly comprising:

first and second main members each defining an outer main member portion, a spacer main member portion, and an inner main member portion, where the spacer main member portion is arranged between the outer main member portion and the inner main member portion, a plurality of cross members each defining a first cross member portion, a second cross member portion, and a third cross member portion, where the second cross member portion is arranged between the first cross member portion and the third cross member portion, a plurality of end plate members, and a plurality of end brace members; wherein the outer main member portions of the first and second main members are riveted to the skin panel within at least a portion of the brace region such that the inner main member portion of the first main member and the inner main member portion of the second main member extend toward each other;

the first cross member portions of the plurality of cross members are riveted to the skin panel within at least a portion of the brace region such that portions of an upper surface of each of the third cross member portions are in contact with a portion of a lower surface of one of the inner main member portions;

lower surfaces of each of the end plate members are in contact with the upper surface of one of the third cross member portions;

a lower surface of each of the end brace members is in contact with an upper surface of one of the inner main member portions and an upper surface of one of the end plate members, and a plurality of rivets is arranged such that at least one rivet extends through at least one of the brace members, the inner main member portion of one of the first and second main members, and the third cross member portion of one of the plurality of cross members, and at least one rivet extends through at least one of the brace members, one of the end plate members, and the third cross member portion of one of the cross members.

2. A blank panel assembly as recited in claim 1, in which the skin panel is metal.

3. A blank panel assembly as recited in claim 1, in which the brace assembly is metal.

4. A blank panel assembly as recited in claim 1, in which:

the skin panel is metal; and the brace assembly is metal.

5. A blank panel assembly as recited in claim 1, in which at least one accessory opening is formed in the accessory region.

6. A configured panel assembly configured for a particular helicopter configuration of a helicopter airframe configurable in one of a plurality of helicopter configurations, the configured panel assembly comprising:

a skin panel configured to define a brace region and an accessory region, where the brace region and the accessory region are located relative to the skin panel based on operational characteristics of the particular helicopter configuration;

a brace assembly operatively connected to the skin panel within the brace region of the skin panel, the brace assembly comprising:

first and second main members each defining an outer main member portion, a spacer main member portion, and an inner main member portion, where the spacer main member portion is arranged between the outer main member portion and the inner main member portion, a plurality of cross members each defining a first cross member portion, a second cross member portion, and a third cross member portion, where the second cross member portion is arranged between the first cross member portion and the third cross member portion, a plurality of end plate members, and a plurality of end brace members; and at least one accessory adapted to be supported relative to the helicopter airframe in the particular helicopter configuration; wherein the outer main member portions of the first and second main members are riveted to the skin panel within at least a portion of the brace region such that the inner main member portion of the first main member and the inner main member portion of the second main member extend toward each other;

the first cross member portions of the plurality of cross members are riveted to the skin panel within at least a portion of the brace region such that portions of an upper surface of each of the third cross member portions is in contact with a portion of a lower surface of one of the inner main member portions;

lower surfaces of each of the end plate members are in contact with the upper surface of one of the third cross member portions;

a lower surface of each of the end brace members is in contact with an upper surface of one of the inner main member portions and an upper surface of one of the end plate members, and a plurality of rivets is arranged such that at least one rivet extends through at least one of the brace members, the inner main member portion of one of the first and second main members, and the third cross member portion of one of the plurality of cross members, and at least one rivet extends through at least one of the brace members, one of the end plate members, and the third cross member portion of one of the cross members.

7. A configured panel assembly as recited in claim 6, in which the skin panel is metal.

8. A configured panel assembly as recited in claim 6, in which the brace assembly is metal.

9. A configured panel assembly as recited in claim 6, in which:

the skin panel is metal; and the brace assembly is metal.

10. A configured panel assembly as recited in claim 6, in which at least one accessory opening is formed in the accessory region.

11. A configured panel assembly configured for a particular helicopter configuration of a helicopter airframe configurable in one of a plurality of helicopter configurations, the configured panel assembly comprising:

a metal skin panel configured to define a brace region and an accessory region, where the brace region and the accessory region are located relative to the skin panel based on operational characteristics of the particular helicopter configuration;

a brace assembly operatively connected to the skin panel within the brace region of the skin panel, the brace assembly comprising:

first and second metal main members each defining an outer main member portion, a spacer main member portion, and an inner main member portion, where the spacer main member portion is arranged between the outer main member portion and the inner main member portion, a plurality of metal cross members each defining a first cross member portion, a second cross member portion, and a third cross member portion, where the second cross member portion is arranged between the first cross member portion and the third cross member portion, a plurality of metal end brace members, and a plurality of end plate members; and at least one accessory to be supported relative to the helicopter airframe in the particular helicopter configuration; wherein the outer main member portions of the first and second main members are riveted to the skin panel within at least a portion of the brace region;

the first cross member portions of the plurality of cross members are riveted to the skin panel within at least a portion of the brace region such that portions of an upper surface of each of the third cross member portions are in contact with a portion of a lower surface of one of the inner main member portions;

each end brace member is in contact with one of the inner main member portions and one end plate member, and a plurality of rivets is arranged such that at least one rivet extends through at least one of the brace members, the inner main member portion of one of the first and second main members, and the third cross member portion of one of the plurality of cross members, and at least one rivet extends through at least one of the brace members, one of the end plate members, and the third cross member portion of one of the cross members.

12. A configured panel assembly as recited in claim 11, in which at least one accessory opening is formed in the accessory region.

* * * * *